US006922824B2

(12) United States Patent
Swetland

(10) Patent No.: US 6,922,824 B2
(45) Date of Patent: Jul. 26, 2005

(54) SYSTEM AND METHOD FOR TRANSFORMING OBJECT CODE

(75) Inventor: Brian Swetland, Mountain View, CA (US)

(73) Assignee: Danger, Inc., Palo Alto, CA (US)

( * ) Notice: Subject to any disclaimer, the term of this patent is extended or adjusted under 35 U.S.C. 154(b) by 409 days.

(21) Appl. No.: 09/848,384

(22) Filed: May 2, 2001

(65) Prior Publication Data

US 2004/0015852 A1 Jan. 22, 2004

Related U.S. Application Data

(63) Continuation-in-part of application No. 09/792,551, filed on Feb. 23, 2001.

(51) Int. Cl.[7] .................................................. G06F 9/44
(52) U.S. Cl. ...................... 717/117; 717/107; 717/159; 717/161
(58) Field of Search ................................. 717/151–167, 717/100–123; 345/804–805; 709/200–253, 310–315, 331; 713/2

(56) References Cited

U.S. PATENT DOCUMENTS

| 5,815,718 | A | | 9/1998 | Tock |
| 5,966,542 | A | | 10/1999 | Tock |
| 5,966,702 | A | | 10/1999 | Fresko et al. |
| 5,999,737 | A | | 12/1999 | Srivastava |
| 6,102,966 | A | | 8/2000 | Tyma |
| 6,446,084 | B1 | * | 9/2002 | Shaylor et al. ............. 707/200 |
| 6,557,023 | B1 | | 4/2003 | Taivalsaari |
| 6,618,855 | B1 | * | 9/2003 | Lindholm et al. .......... 717/126 |

FOREIGN PATENT DOCUMENTS

| EP | 0 913 769 A2 | 5/1999 |
| WO | WO 99/31576 | 6/1999 |

OTHER PUBLICATIONS

Bradley et al., "JAZZ: An Efficient Compressed Format for Java Archive Files", Proceedings of the 1998 conference of the Centre for Advanced Studies on Collaborative research, Toronto, Ontario, Canada, pp.: 1–9, Nov. 1998.*
Pugh, "Compressing Java Class Files", ACM, pp.: 247–258, May 1999.*
Yuhder Lin, "The Design and Implementation of Jato: A New Binary File Format for Java", National Taiwan University, Taiwan, pp. i–vi, 1–78, Jun. 2000.*
Frederic Painchaud , et al., "On Implementaton Of A Stand–Alone Java™ Bytecode Verifier", Infrastructure For Collaborative Enterprises, 2000. IEEE 9th International Workships on Gaithersburg, MD. USA Jun. 14–16, 2000, Los Alamitos, CA IEEE Comput. Soc, US Jun. 14, 2000, pp. 189–194.
Glossner J, et al.: "Delft–Java Link Translation Buffer", Euromicro Conference, 1998, Proceedings. 24th Vasteras, Swenden Aug. 25–27, 1998, Los Alamitos, CA IEEE Comput. Soc, US, Aug. 25, 1998, pp. 221–228.

* cited by examiner

Primary Examiner—Ted T. Vo
(74) Attorney, Agent, or Firm—Blakely, Sokoloff, Taylor & Zafman LLP

(57) ABSTRACT

A method comprising: converting bytecodes into a graph of jop objects to track where jump operations pointed before modification of the bytecodes; adjusting constant pool references from local to global numbers based on the graph; and combining the bytecodes into a bundle.

22 Claims, 12 Drawing Sheets

Bundle Mapping

SYSTEM AND METHOD FOR TRANSFORMING OBJECT CODE

The present patent application is a Continuation-in-part (CIP) of prior application Ser. No. 09/792,551, filed Feb. 23, 2001, entitled SYSTEM AND METHOD FOR TRANSFORMING OBJECT CODE

BACKGROUND OF THE INVENTION

1. Field of the Invention

This invention relates generally to the field of computer programming. More particularly, the invention relates to a system and method for transforming object-oriented program code.

2. Description of the Related Art

Java is an object-oriented programming language which is used to design computer programs which are platform-independent. That is, the same Java object code may be used on numerous different operating systems including, for example, Windows 95, Unix, Solaris, and the Macintosh OS. This interoperability makes Java an ideal choice for programming Internet applications.

Once a program is written in Java source code, the Java compiler generates a compact, architecture-neutral object code (commonly referred to as known as Java bytecode) which may be executed by a runtime interpreter residing on the client computer. This runtime interpreter is commonly referred to as a Java "virtual machine." The Java virtual machine interprets the object code so that the instructions may be executed by the client's native microprocessor. Virtual machines are included in commonly available Internet browser applications such as Netscape Navigator™ or Microsoft Internet Explorer.™

Java was derived from the popular C++ programming language and retained many significant features of that language. For example, Java, like C++, is object-oriented. Accordingly, Java programs are developed around "classes" and "objects." These two terms are not interchangeable but they are directly related to one another. A class can be thought of as a template or blueprint from which an object is made. An object may contain some number of "fields" in which data (such as integers, strings of characters, or references to other objects) may be stored. A class defines a number of actions ("methods") which may operate on the object and are either implemented in bytecode, linked to native code, or abstract. Every object is an "instance" of some specific class—containing the described fields an may be operated upon by the described methods.

A "class file" is a binary object that describes a single class—all the fields, methods, object code of those methods, etc. The format of class files is described in detail by chapter four of "The Java Virtual Machine Specification" (ISBN 0-201-43294-3). The basic layout of a class file shall be described below.

Programmers typically combine groups of ready-made class files, referred to as "class libraries," for writing programs. For example, a class library is typically available for providing graphical user interface ("GUI") functions such as windowing routines, buttons, scroll bars and other graphical features.

As illustrated in FIG. 1, an exemplary class file 100 is comprised of a header 101, a plurality of constant pool entries 102, and one or more methods 103–105 and/or fields 106, 107. The header 101 contains data for identifying a class file as a class file (e.g., the revision information). The constant pool entries 102 are each comprised of a header portion (a single byte "tag") 111, 121, 131, 141, and a variable length data portion 113, 123, 133, 143, respectively. The header portion 111, 121, 131, 141 indicates the type of constant pool entry. According to the specification, entries may be of the type Class, FieldRef, Methodref, InterfaceMethodref, String, Integer, Float, Long, Double, NameAndType, or Utf8. The data portion 113, 123, 133, 143 contains the actual constant pool information associated with the entry. The Utf8, Integer, Float, Long, and Double types encapsulate simple constant data as implied by their names. The other types contain references (by one-based index) to other entries. For example, a Methodref refers to a Class entry and a NameAndType entry, identifying a specific method of a specific class.

For example, as illustrated in FIG. 2, class files 200, 210 and 220 each contain constant pool entries which refer to methods and fields provided by class file 230. More specifically, class files 200, 210 and 220 include "MethodRef Foo" entries 203, 213 and 223, respectively, in their constant pools 202, 212, and 222 which refer to the method Foo 236 of class 230. In addition, class file 230 itself includes a "MethodRef Foo" entry in its constant pool 232 which refers to method Foo 236. Similarly, the constant pools of class files 200, 220 and 230 each include a "FieldRef Bar" entry which refer to field Bar 238 in class file 230.

Accordingly, when each of the foregoing class files are used in a program (e.g., a Java applet or application), three redundant constant pool entries referring to field Bar 238 are loaded into memory (i.e., FieldRef entries 240, 241, and 242) and four redundant constant pool entries referring to method Foo 236 are loaded into memory (i.e., MethodRef entries 203, 213, 223, 233). Considering the fact that a program may utilize scores of class files and that each class file may contain hundreds, or even thousands, of constant pool entries, a significant amount of memory may be consumed by redundant information.

Accordingly, what is needed is a system and method for reducing the memory requirements for object-oriented programs.

SUMMARY

A method comprising: converting bytecodes into a graph of jop objects to track where jump operations pointed before modification of the bytecodes; adjusting constant pool references from local to global numbers based on the graph; and combining the bytecodes into a bundle.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Figure 1:
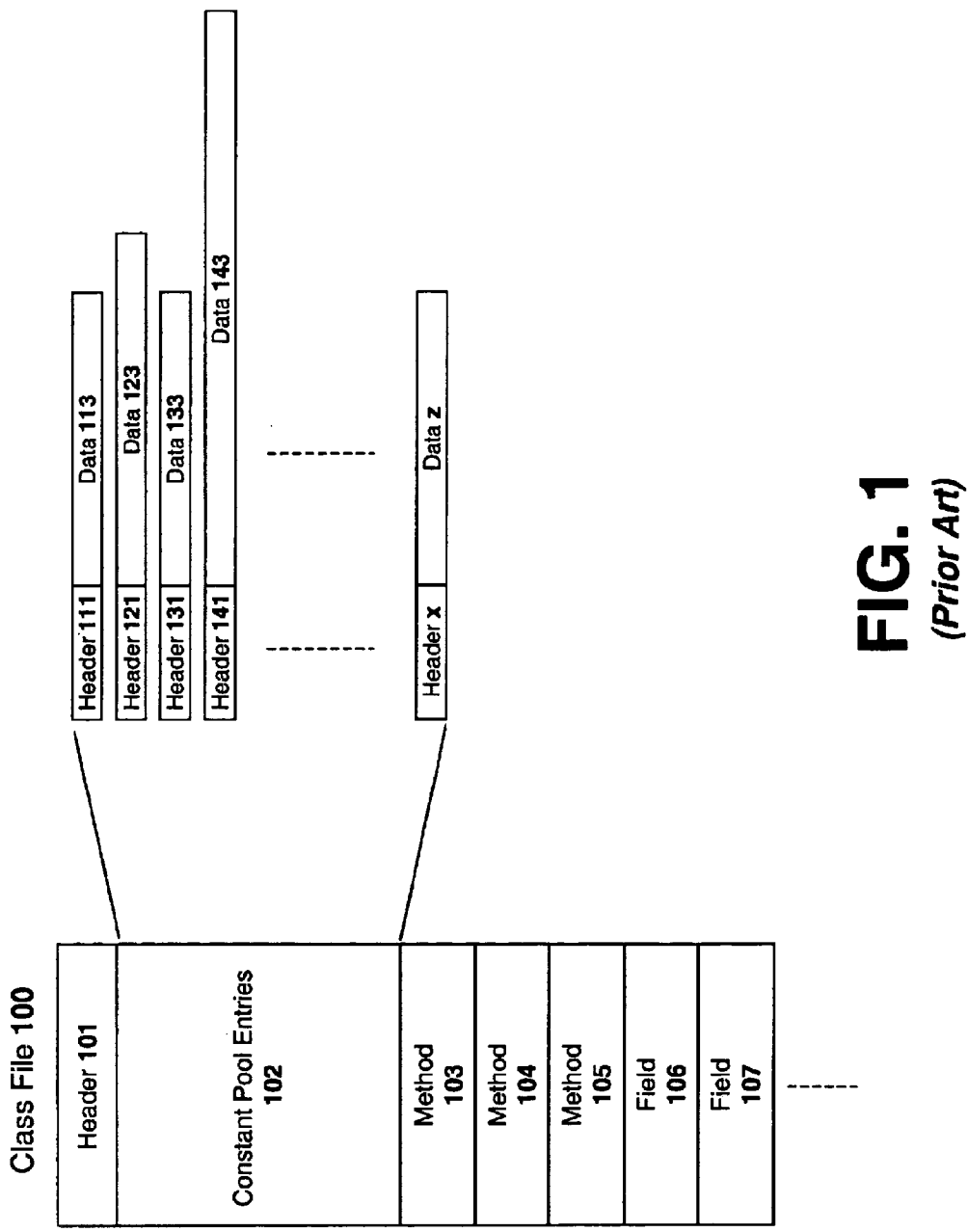
FIG. 1 illustrates constant pool entries and other elements within a class file.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

An Exemplary Network Architecture

Elements of the present invention may be included within a client-server based architecture. According to one embodiment, a portal server communicates with clients and other network servers over a network (e.g., the Internet). The network over which the clients and servers transmit and receive data may be comprised of any combination of private (e.g., leased) and/or public communication channels. These may include, for example, Digital Signal ("DS") channels (e.g., DS-3/T-3, DS-1/T1), Synchronous Optical Network ("SONET") channels (e.g., OC-3/STS-3), Integrated Services Digital Network ("ISDN") channels, Digital Subscriber Line ("DSL") channels, cable modem channels and a variety of wireless communication channels including satellite broadcast and cellular channels.

In addition, various networking protocols may be used to support communication across the network including, for example, the Asynchronous Transfer Mode ("ATM"), Ethernet, and Token Ring (at the data-link level); as well as Transmission Control Protocol/Internet Protocol ("TCP/IP"), Internetwork Packet Exchange ("IPX"), AppleTalk and DECnet (at the network/transport level). It should be noted, however, that the principles of the invention are not limited to any particular communication channel or protocol.

The portal server in one embodiment includes a user database for storing various types of user configuration and account data. Users may register and login to the portal server from a client by specifying a user ID and/or password. According to one embodiment, a user connects to the servers, via a browser application such as Netscape Navigator™ or Microsoft Internet Explorer™ which communicates via the Hypertext Transfer Protocol (hereinafter "HTTP").

In one embodiment, users may configure the portal server to retrieve and manage specific types of information. For example, a user may configure the portal server to retrieve up-to-date stock quotes for a specified set of stocks (e.g., reflecting the user's portfolio), to collect the weather forecast for the user's hometown, and/or to retrieve recent articles relating to a particular sports franchise. The portal server will then retrieve the specified information from other servers (e.g., server) on behalf of the user.

In addition to information retrieval and management, in one embodiment the portal server also provides application services such as email, online scheduling (e.g., appointments, to-do lists, etc), instant messaging, contact management, word processing and a variety of other online services. Users may access these services by logging in to the portal server with a valid user ID and password. In one embodiment, the portal server generates a unique, personalized Web page for each user containing links to all, or a subset of, the information and/or services subscribed to by the user.

Embodiments of the Invention

Figure 2:
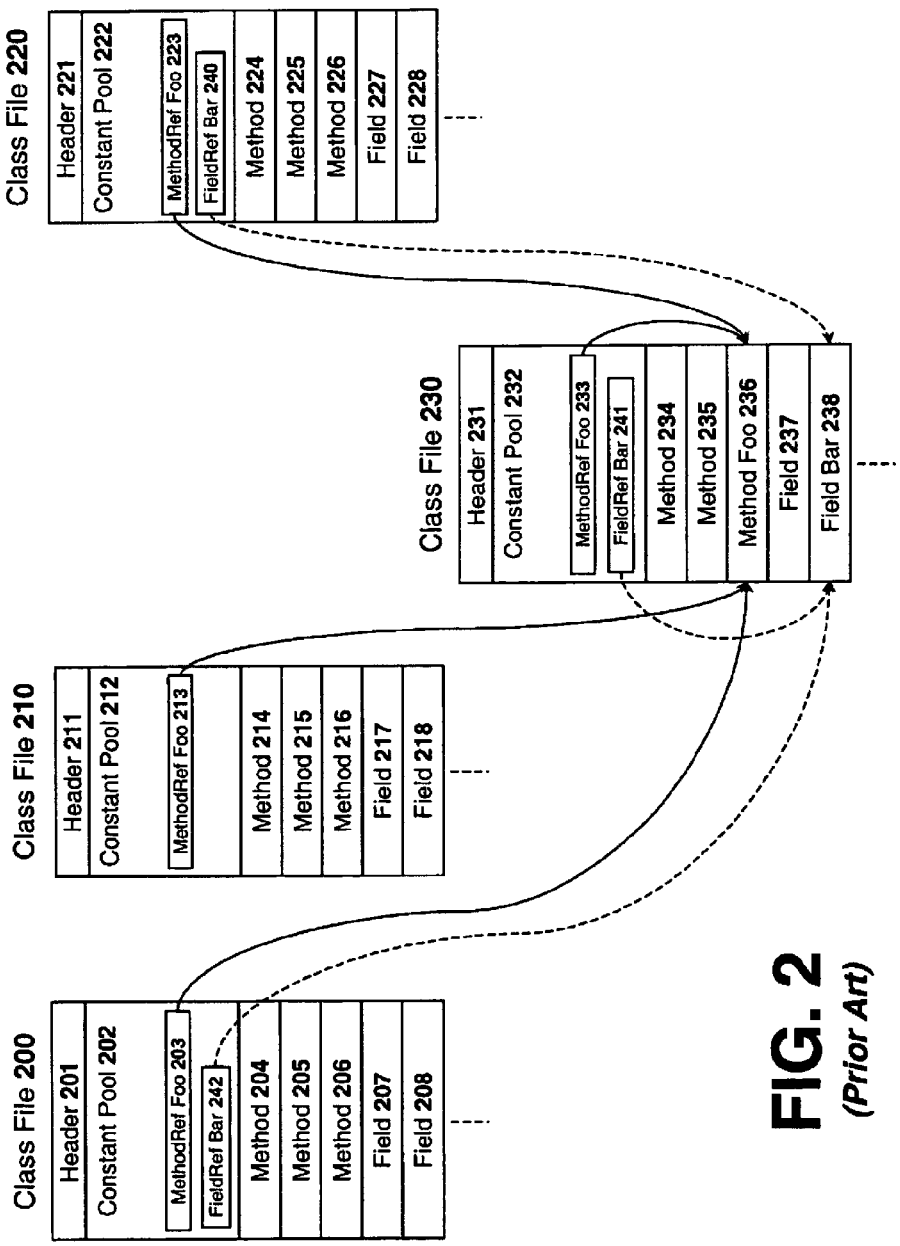
FIG. 2 illustrates MethodRef and FieldRef constant pool entries referring to methods and fields within a class file.

In one embodiment, a portal device stores and processes user-specified information and/or programs as well as non-user-specified information/programs (e.g., targeted advertisements based on the user's profile). The information/programs may be transmitted to the portal device through the client, and/or directly via wireless broadcast (as illustrated in FIG. 2 and described in detail below). Thus, the portal device in this embodiment is a removable extension of the portal server, storing a subset of the information and services maintained by the portal server on behalf of the user. For example, a user may configure the portal server to periodically download the user's to-do list (or other scheduling data) to the portal device (e.g., every morning, every two hours, every time the user connects the portal device to the client, etc). When the user leaves the office, he/she can simply take the portal device with him/her and view his/her schedule throughout the day.

The timing of the information/program download may depend on the particular embodiment of the portal device. For example, if a wireless embodiment is used (described below) downloads may occur at any time when the portal device is within wireless transmission range, whereas if a non-wireless embodiment is used, downloads may be limited to periods of time when the portal device is connected to the portal server.

In one embodiment, the user may customize the portal device preferences and content which will be downloaded to the portal device from the portal server. This may be accomplished, for example, by selecting certain preferences/content from a portal server Web page (e.g., by using an online programming interface as described below). For example, the user may choose to have each day's to-do list downloaded to his portal device and may also program the device (e.g., via the portal server) to continually display the next scheduled event for the day. Various other user interface and content-based data may be transmitted to the portal device from the portal server while still complying with the underlying principles of the invention.

Client Link

One embodiment of the portal device communicates to the portal server via a communication link with the client. The communication link may be established via a physical I/O connection with the client such as a Universal Serial Bus ("USB") interface or a communication ("serial") interface. Alternatively, the communication link may be a wireless link such as an Infrared I/O channel or a radio frequency ("RF") I/O channel.

In one particular embodiment, the client link is formed using a capacitively-coupled communication channel. As is known in the art, a capacitor is any dielectric sandwiched between two conductive elements. In this embodiment, one of the two conductive elements is located within the portal device and the second of the two conductive elements is located external to the portal device and is communicatively coupled to an I/O port of the client. For example, in one embodiment, the second conductive element may be disposed within user's mouse pad. According to this embodiment, the user may simply place the portal device on the mouse pad to set up the capacitive communication link with the client. It should be noted, however, that various other client links may be employed while still complying with the underlying principles of the invention.

Direct Radio Broadcast

In one embodiment, data and/or programs are transmitted to the portal device from the portal server over an RF link. In this embodiment, the organization maintaining the portal server and/or implementing other features of the system and method described herein (hereinafter the "portal organization" or "PO"), may lease a portion of the RF transmission bandwidth from one or more radio stations. It should be noted, however, that various RF transmission techniques may be used without departing from the underlying principles of the invention.

Figure 3:
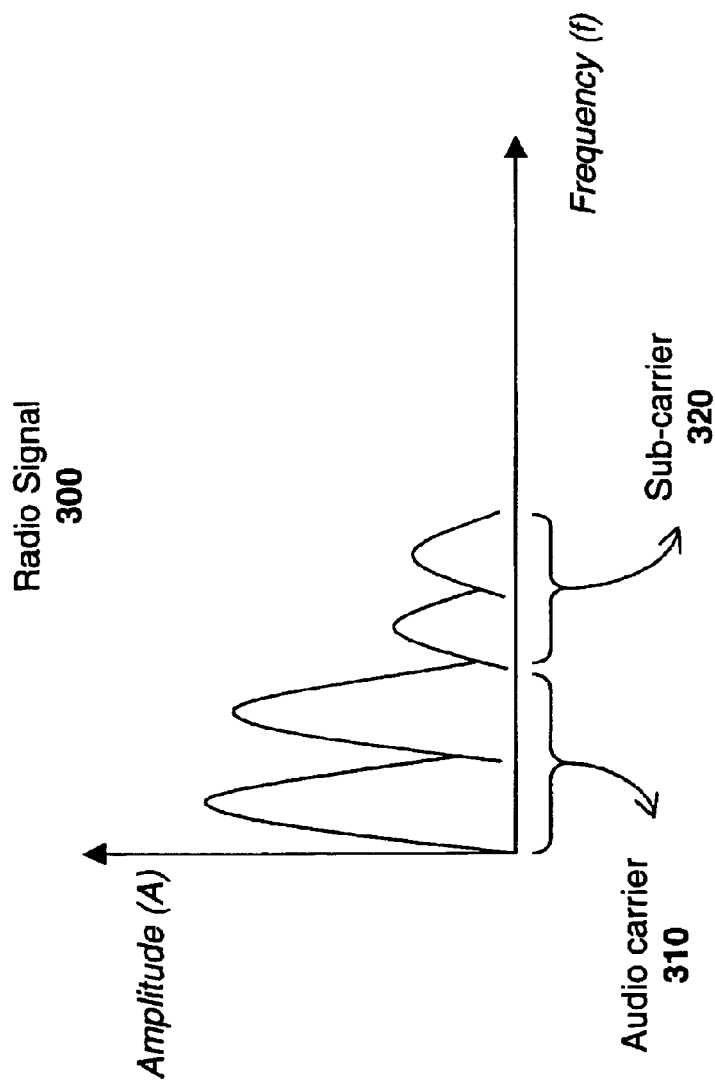
FIG. 3 illustrates a radio signal including its sub-carrier in the frequency domain.

Referring to FIG. 3, in one particular embodiment, the PO will use the radio station's sub-carrier frequency band 320 to transmit data and/or programs to the portal device 150. As it is known in the art, radio stations are licensed a sub-carrier frequency block 320 along with the audio carrier frequency block 310. Although some radio stations use the sub-carrier frequency block 320 (e.g., for foreign-language broadcast), most do not. As such, the present embodiment provides a mechanism for transmitting data over an infrequently-used wireless transmission channel.

To further conserve bandwidth within the sub-carrier frequency block 320, in one embodiment, the data transmitted over the RF link 220 is not addressed to any one specific portal device. Rather, in this embodiment, the data is simply transmitted (e.g., with a tag that identifies the data) and is sensed by any portal device(s) 150 listening within the sub-carrier block 320. This type of addressing will be referred to herein as "data addressable" addressing (in contrast to "device addressable addressing in which a device address is associated with the transmitted data). The individual portal devices 150 that sense the various data transmissions may ignore them or may take some other specified action (e.g., store and display the transmitted data), depending on how the devices 150 are configured. For example, a portal device 150 may be configured by a user to track stock quotes for stocks within his/her portfolio and to ignore all other stock quotes. Similarly, the user may configure the portal device 150 to listen for local weather reports, local news headlines, and/or any other information which may be accessed by the user directly at the portal server 110.

In one embodiment, the data broadcast in a particular geographical region will be selected based on the number of users in that region who have registered on the portal server 110 and/or the types of data requested by users in the region. For example, if no users in the region have configured the portal server 110 to gather a particular stock quote, then the portal server 110 will not transmit that stock quote over the RF link 220 in that region. Similarly, the portal server 110 may be configured to only transmit local data such as weather and local news in the local broadcast region to which the weather and news pertains (i.e., where it will most likely be requested). Broadcasting data selectively in this manner will further improve bandwidth over the RF link 220 (i.e., by reducing unnecessary data transmissions).

In one embodiment, portal devices 150 may be addressed directly (e.g., by including the device's serial number or other ID code in an address field of the data transmission). This embodiment may be provided by the PO to users as a "premium" service, under which the user pays an additional fee to receive personally-addressed information over the sub-carrier 360 (e.g., email messages, daily schedules, etc), as well as the more general information described above. Users of this embodiment may be charged on a subscription basis and/or on a per-use basis, depending on the embodiment. Of course, other pricing models may be employed while still complying with the underlying concept. The PO may also employ this embodiment under certain emergency situations (e.g., where it is crucial that a particular user receive a data transmission immediately).

Embodiments of the Portal Device

Figure 4:
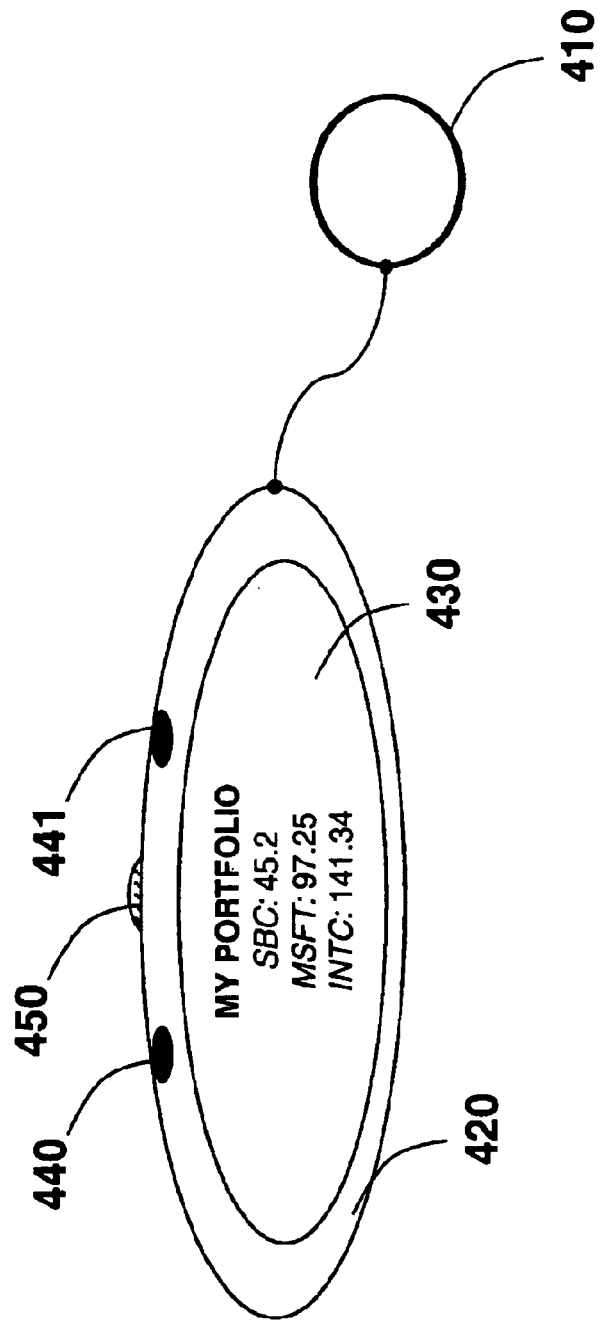
FIG. 4 illustrates an external view of a portal device according to one embodiment of the invention.

FIG. 4 illustrates an external view of one embodiment of a portal device 420 which may be used as a key chain. As shown, this embodiment includes a key chain ring 410 for securing a set of keys (or other personal effects) to the device 420. Also illustrated is a display 430 for displaying various types of portal data. In one embodiment the display is a Liquid Crystal Display ("LCD"). Of course, other display technologies may be implemented while still complying with the underlying principles of the invention (e.g., Light Emitting Diode ("LED") displays). Also included is a set of control buttons 440 and 441 for selecting menu items and/or jumping back and forth between stored portal data and a control knob 450 for scrolling between menu items and/or data. In one embodiment, the control knob 450 rotates on an axis which is substantially perpendicular to the plane of the display 430.

Additional attachable embodiments of the portal device 150 include a necklace configuration, a pocket watch configuration, and a sports configuration (e.g., wherein the portal device is strapped firmly around a user's arm). In the latter configuration, the shell of the portal device may be comprised of a waterproof material to avoid water damage to the internal components of the device.

Figure 5:
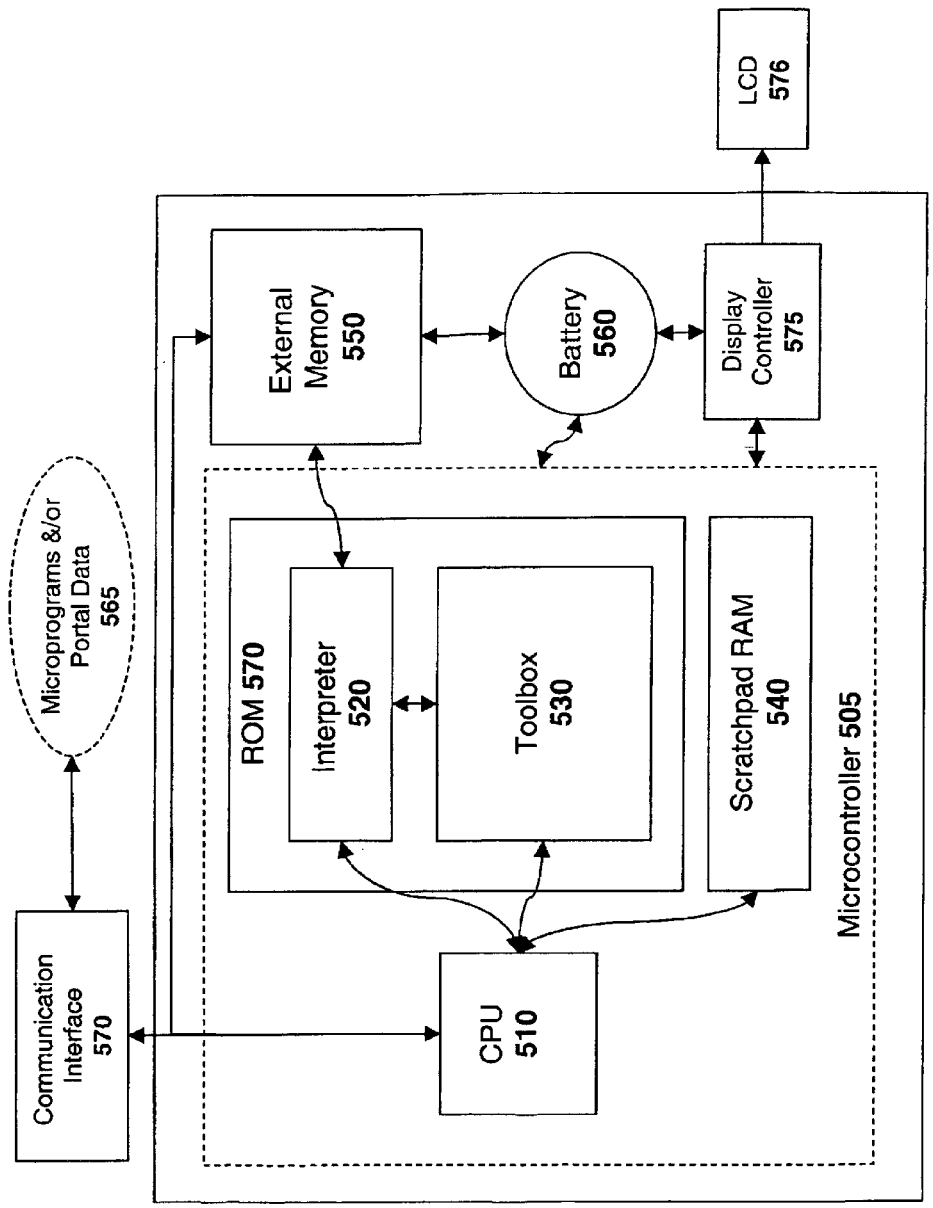
FIG. 5 illustrates an internal view of a portal device according to one embodiment of the invention.

As illustrated in FIG. 5, one embodiment of the portal device 150 is comprised generally of a microcontroller 505, an external memory 550, a display controller 575, and a battery 560. The external memory 550 may be used to store programs and/or portal data 565 transmitted to the portal device 150 from the portal server 110 (e.g., via client 140 and/or radio station 210). In one embodiment, the external memory 550 is non-volatile memory (e.g., an electrically erasable programmable read only memory ("EEPROM"); a programmable read only memory ("PROM"), etc). Alternatively, the memory 550 may be a volatile memory (e.g., random access memory or "RAM") but the data stored therein may be continually maintained via the battery 560. The battery 560 in one embodiment is a coin cell battery (e.g., of the same type used in portable electronic devices such as calculators and watches). In one embodiment, when the battery power decreases below a threshold level, the portal device 150 will notify the user and/or the portal server 110. The portal server 110 in one embodiment will then automatically send the user a new battery.

The microcontroller 505 of one embodiment is comprised of a central processing unit ("CPU") 510, a read only memory ("ROM") 570, and a scratchpad RAM 540. The ROM 570 is further comprised of an interpreter module 520 and a toolbox module 530.

The toolbox module 530 of the ROM 570 contains a set of toolbox routines for processing data, text and graphics on the portal device 150. These routines include drawing text and graphics on the portal device's display 430, decompressing data transmitted from the portal server 110, reproducing audio on the portal device 150, and performing various input/output and communication functions (e.g., transmitting/receiving data over the client link 160 and/or the RF link 220). A variety of additional portal device functions may be included within the toolbox 530 while still complying with the underlying principles of the invention.

In one embodiment, microprograms and portal data 560 are transmitted from the portal server 110 to the external memory 550 of the portal device via a communication interface 570 under control of the CPU 510. Various communication interfaces 570 may be employed without departing from the underlying principles of the invention including, for example, a Universal Serial Bus ("USB") interface or a serial communication ("serial") interface. The microprograms in one embodiment are comprised of compact, interpreted instructions known as "bytecodes," which are converted into native code by the interpreter module 520 before being executed by the CPU 510. One of the benefits of this configuration is that when the microcontroller/CPU portion of the portal device 150 is upgraded (e.g., to a faster and/or less expensive model), only the interpreter module 520 and toolbox 530 of the ROM needs to be rewritten to interpret the currently existing bytecodes for the new microcontroller/CPU. In addition, this configuration allows portal devices 150 with different CPUs to coexist and execute the same microprograms. Moreover, programming frequently-used routines in the ROM toolbox module 530 reduces the size of microprograms stored in the external memory 550, thereby conserving memory and bandwidth over the client link 160 and/or the RF link 220. In one embodiment, new interpreter modules 520 and/or toolbox routines 530 may be developed to execute the same microprograms on cellular phones, personal information managers ("PIMs"), or any other device with a CPU and memory.

One embodiment of the ROM 570 may be comprised of interpreted code as well as native code written specifically for the microcontroller CPU 505. More particularly, some toolbox routines may be written as interpreted code (as indicated by the arrow between the toolbox 530 and the interpreter module 520) to conserve memory and bandwidth for the same reasons described above with respect to microprograms. Moreover, in one embodiment, data and microprograms stored in external memory 550 may be configured to override older versions of data/microprograms stored in the ROM 570 (e.g., in the ROM toolbox 530).

Data Compression

As described above, microprograms and portal data may be transmitted to the portal device 150 in a compressed format. As such, in one embodiment, decompression logic is programmed into the microcontroller ROM 570 (e.g., within the toolbox 530) and is used to interpret and/or decompress the microprograms/data as they are received.

In one embodiment, a plurality of uncompressed data is stored in the ROM 570, and codes identifying the uncompressed data are transmitted across the RF link 220 and/or client link 160. For example, instead of transmitting the entire market code for a particular stock, such as "MSFT" for Microsoft, a compressed code, e.g., "M," may be transmitted to the portal device 150 instead. The ROM 570 in this embodiment may include a lookup table (or similar decode logic) for retrieving the real market code "MSFT," using the compressed code, "M." Once the real code is retrieved from the ROM 570, it may be displayed on the portal device 150 as illustrated in FIG. 4. It should be noted, however, that the underlying principles of the invention may be practiced using a variety of coding schemes and/or digital compression techniques.

User Registration and Authentication

Figure 6:
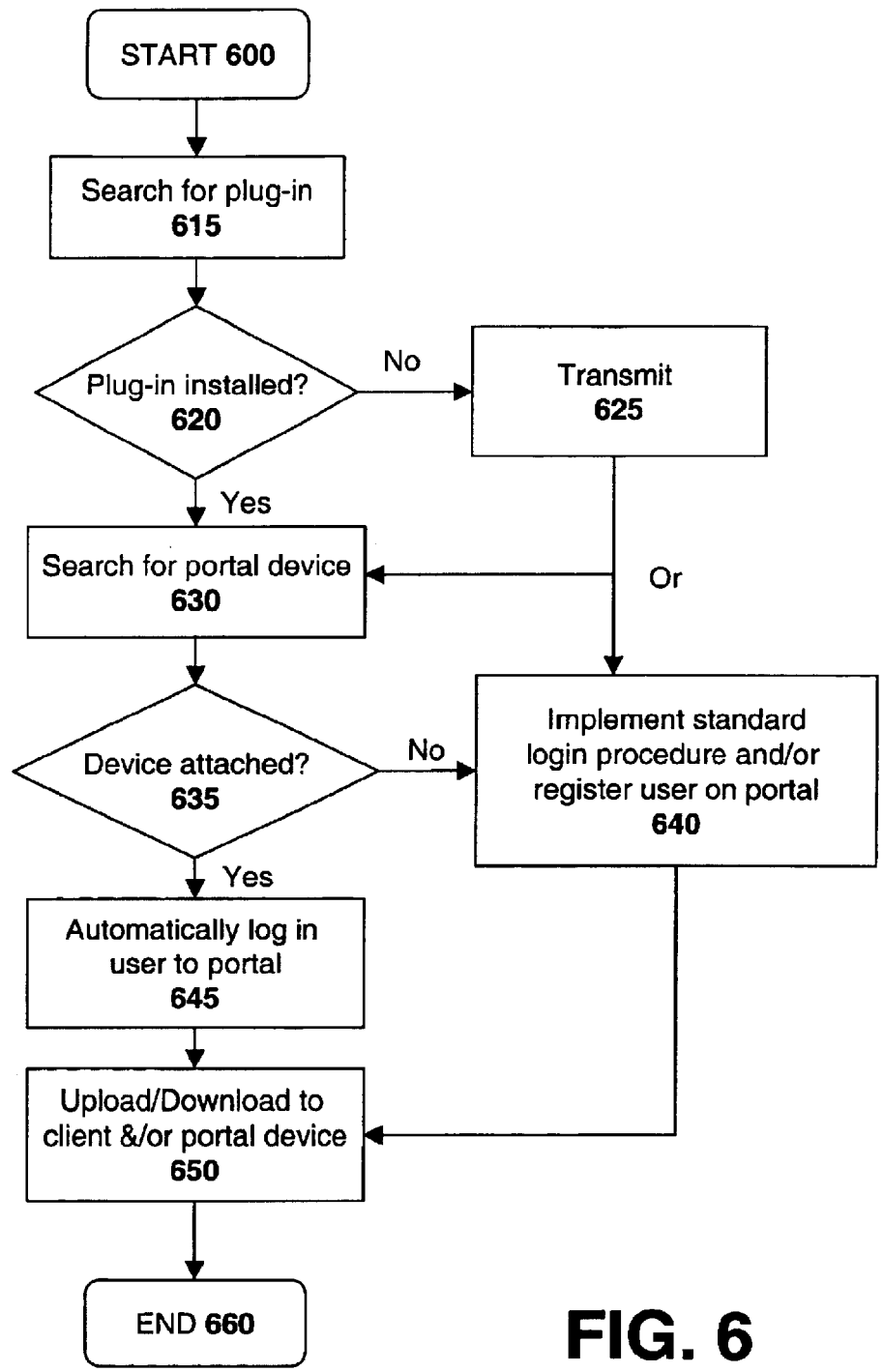
FIG. 6 illustrates a process according to one embodiment of the invention wherein a user is logged in to a portal server.

One embodiment of the invention will now be described with reference to the flowchart of FIG. 6. According to this embodiment, when a user initially connects to the portal server 110 (e.g., from client 140), the portal server 110 will determine whether a portal device plug-in is installed on the user's Web browser (at 615). As is known in the art, plug-ins are auxiliary programs added to Web browsers to provide them with new levels of functionality. One embodiment of the present invention uses a plug-in to coordinate communication between the portal server 110, the client 140, and the portal device 150. In addition, the plug-in may convert and/or compress "standard" portal programs/data (e.g., programs/data meant to be executed on the client 140) into microprograms/data that the portal device can properly interpret, as described herein. If the plug-in is not installed, the portal server 110 may automatically transmit and install it on the client 140 (at 625).

At 630, the portal server 110 (e.g., via the plug-in) determines whether the portal device is currently attached to the client 140. If the device 150 is attached then, in one embodiment, the portal server 110 will automatically log the user in. The portal server 110 may automatically authenticate the portal device 150 via a serial number and/or a user authentication key embedded/stored in the device 150. Once the user is logged in to the portal server, he/she can then transmit data to and from the portal device 150 as described herein.

If the device 150 is not attached, however, then the portal server 110 may implement a standard user name/password login procedure and/or may register the user (at 640). During the registration process the user may be asked to respond to a series of questions relating to his/her background (e.g., hobbies, education, career, etc). The portal server 110 may use this information to personalize the content collected and provided to the user and/or to target ads to the user based on the user's preferences. In addition, at this point the user may be provided with an opportunity to configure the portal server 110 to gather and manage specific information on behalf of the user (e.g., particular stocks, sports scores, news, etc) and/or to provide the user with access to certain online applications (e.g., email, electronic scheduling, etc) as described herein.

Online Programming Interface

Figure 7:
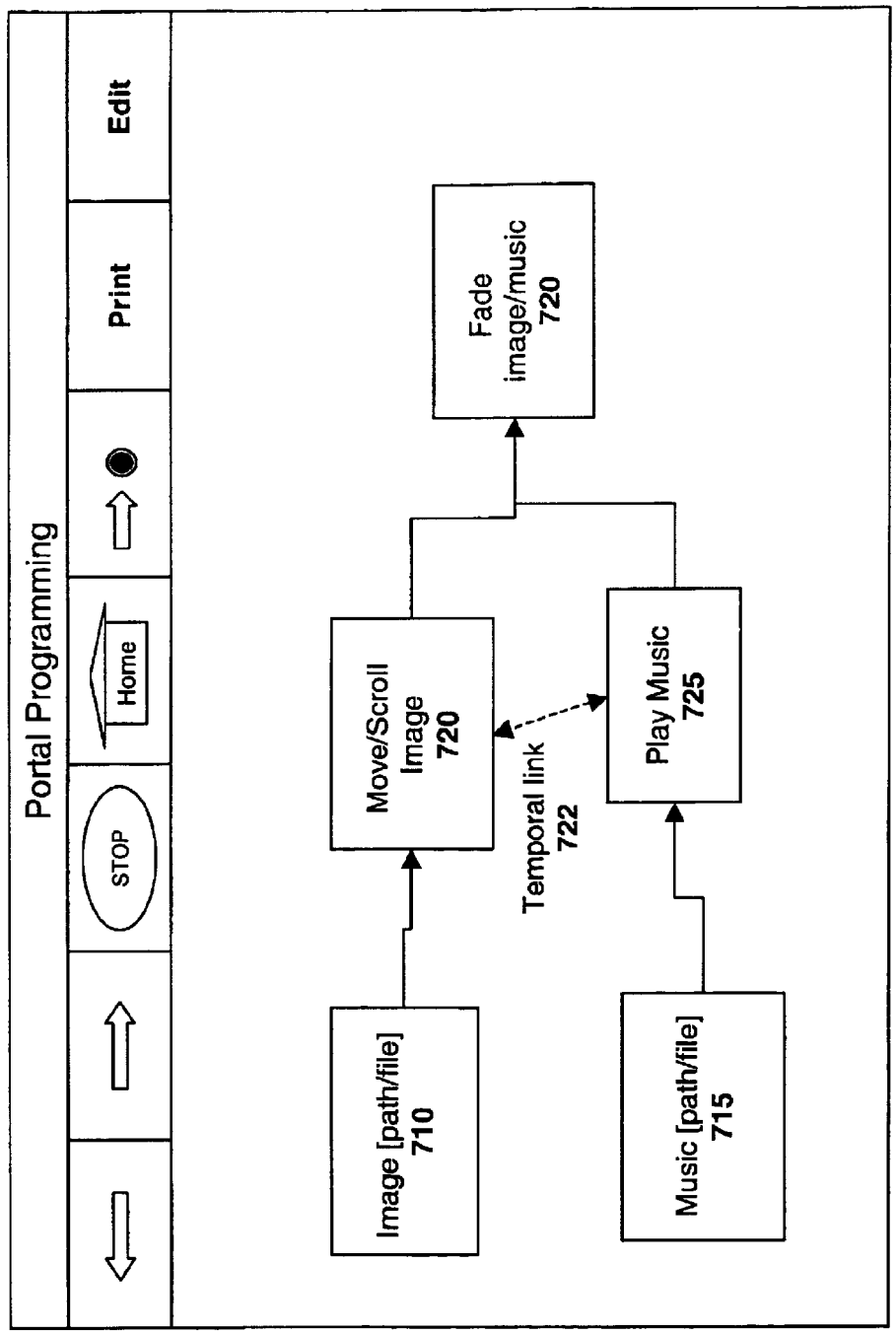
FIG. 7 illustrates a visual programming interface according to one embodiment of the invention.

In one embodiment, registered users are provided with an online visual programming interface such as that illustrated in FIG. 7. Under this embodiment users may construct their own microprograms to be executed on the portal device 150 and/or the client 140. For example, a user may define a programming block as a hyperlink which points to a particular piece of data or series of data (e.g., a current stock quote for AT&T, the San Francisco weather forecast, etc) and may also indicate how frequently the data associated with the hyperlink is to be updated. Multiple such blocks may be chained together to create a continual sequence of information to be displayed on the portal device 150 or the client 140. The particular programs generated by users may depend on whether a wireless portal device 150 is being used. For example, a microprogram designed to download up-to-date stock quotes may require a wireless connection to the portal server 110 to be effective.

As illustrated in FIG. 7, users may also program animation and/or sound into the portal device 150. For example, block 710 points to a particular image file (e.g., a bitmap file) and block 715 points to a particular music file (e.g., a Musical Instrument Digital Interface or "MIDI" file). The user may cause the image to move across the display 430 of the portal device 150 in a specified direction by programming block 720 (e.g., using X and Y coordinate data). Concurrently, the user may program block 725 to play the music track identified in block 715. Temporal link 722 indicates that the movement of the image and the playback of the music track are to take place simultaneously. Programming block 720 indicates that the music and image will both fade out to end the program.

In one embodiment, standard image and/or music files stored on the client 140 are converted to a format which the portal device can interpret (e.g., using a conversion module which may included in the client plug-in). For example, the melody line may be extracted from a MIDI file and transmitted to the portal device as a series of notes. Similarly, bitmap or JPEG images may be converted so that they are properly displayed on the portal device display 430, which in one embodiment is a black & white LCD display.

Portal Key Operations

In one embodiment, each portal device 150 includes a portal key which uniquely identifies the device, the user and/or particular data on the portal server. The key may either be permanently embedded in the device (e.g., the key may be the serial number) or, alternatively, may be selected manually by the user (e.g., the user's ID on the portal server 110) or may be assigned to the device by the portal server 110.

Figure 8:
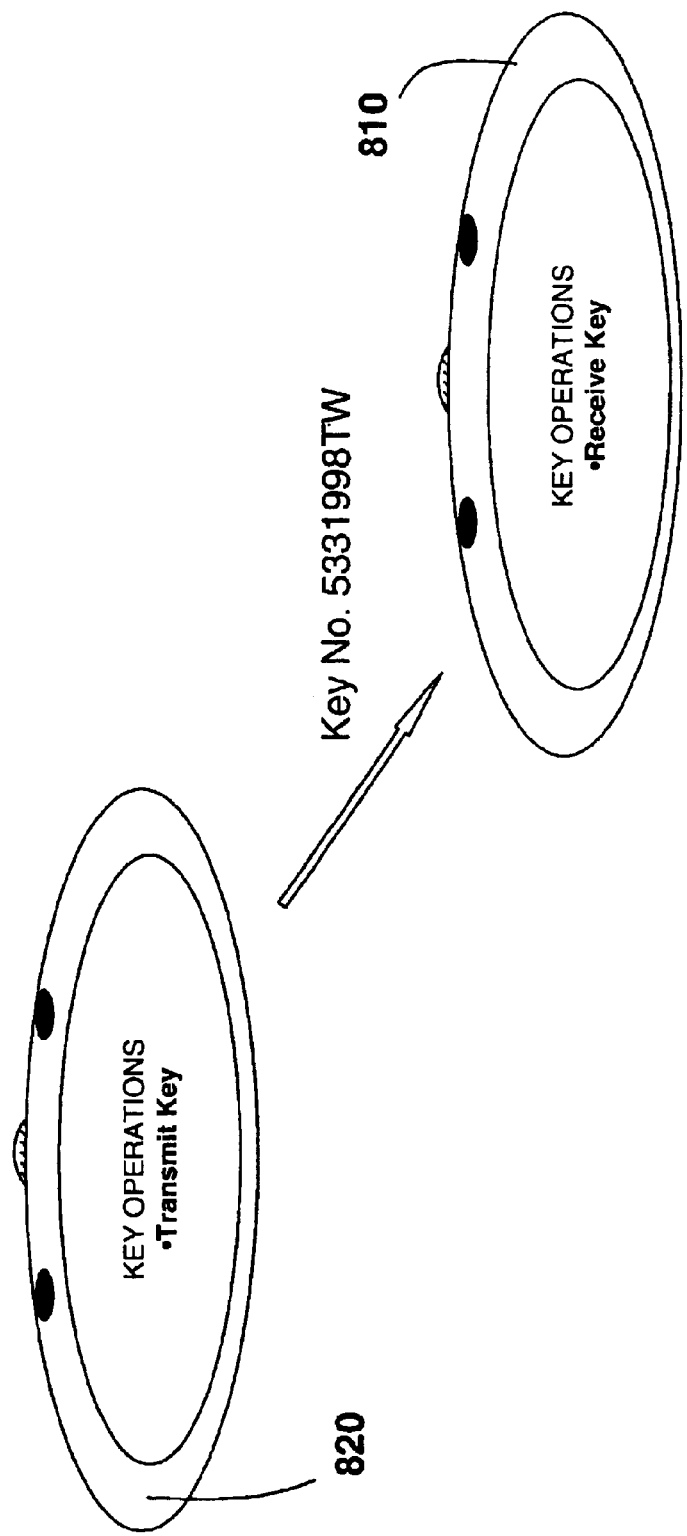
FIG. 8 illustrates key exchange operations employed in one embodiment of the invention.

Regardless of how the portal key is generated, as illustrated in FIG. 8, in one embodiment users may exchange keys between portal devices. Specifically, portal device 810 is shown receiving a portal key (key no. 5331998TW) from portal device 820. In one embodiment, when the user of portal device 810 connects to the portal server 110 after receiving the portal key, he/she will be provided with access to information and/or services associated with the portal key. For example, the user of portal key 820 may store personal and/or business-related information on the portal server 110 which he/she wants to share with the user of portal device 810.

Several portal key applications may be implemented using this type of portal key exchange. These include, for example, social invitations; "business card" exchanges (i.e., where the user of portal device 820 stores an online business card on portal server 110); personal photo exchanges; and/or exchanges of any other information adapted to be stored on a computer network. It should be noted, however, that the underlying principles of the invention are not limited to any particular type of informational exchange.

Exchanging portal keys in the foregoing manner provides an efficient mechanism for exchanging information using a limited amount of portal device memory because the underlying information is stored on the portal server 110, rather than the portal device 150 itself. In addition, when a user exchanges a key, the user is then free to continually update the information/services on the portal server 110 to which the key provides access. For example, a user may exchange a key with a prospective employer, and subsequently update his/her resume on the portal server 110. Similarly, if the user is involved in research, he/she may exchange his/her key with colleagues and continually update the research data on the portal server 110.

In one embodiment, a user may set up a number of different keys on the portal server, each pointing to a different type of information and/or service. The user can then select a particular key to transmit to a second user (e.g., using the portal device controls 440, 441, 450) depending on the information and/or service to be provided to the second user. For example, a user may establish a business key which points to business-oriented information/services (e.g., a firm brochure) and a personal key which points to personal information/services (e.g., personal photos). In one embodiment, the portal device 150 will include one standard key for generally identifying the portal device 150 to the portal server 110 and other users, and any number of user-defined "sub-keys" which can be used to exchanged more specific user data (e.g., such as the business data and personal data described above).

Various advertising and promotional services may be implemented in accordance with the underlying principles of the invention. In one embodiment, portal devices may be set up to broadcast keys to users at a place of business such as a supermarket or a car dealership. A user may choose to receive the key on his/her portal device and thereby acquire additional information about the product/service associated with the key when he/she logs in to the portal server 110. Businesses may offer various types of Internet promotions/discounts to users in this manner. Conversely, a user may choose to transmit his/her key to a portal device located at a business to request that the business automatically contact the user with additional product/service information (e.g., via email, a telephone call, etc).

In one embodiment, advertisements and/or coupons may be transmitted to the user's portal device 150. This may be accomplished over the client link 160 and/or the RF link 220. If transmitted over the client link 160, the ad/coupon may be programmed to trigger at a statistically effective time (one embodiment of the portal device 150 includes a digital clock). For example, a Starbucks® Coffee ad may be downloaded to the portal device 150 at a random time and may be programmed to trigger in the morning, before the user heads in to work. Personal information known about the user (e.g., the user's preferences, the user's daily schedule, etc) may be factored in to the timing decision and/or the decision as to which ads to transmit to the user. The ad/coupon may also be triggered automatically at any time/date via the RF link 220.

If a coupon is transmitted, the user may redeem the coupon in a number of ways. In one embodiment, the user may simply show the coupon code to an employee working at the business for which the coupon is valid. Alternatively, a portal device may be configured directly at the business to automatically redeem coupons (e.g., via a coupon exchange feature similar to the key exchange feature described above). The business' portal device may communicate with the portal server 110 to continually transmit and receive coupon data. In one embodiment, the user's portal device is configured to display a bar code identifying the received coupon/service which may be interpreted by a bar code device at the business to redeem the coupon/service. The underlying principles of the invention may be implemented using various additional advertisement and/or coupon redemption mechanisms.

In one embodiment, a coupon or advertisement may be transmitted to the user's portal device 150 from a portal device located at a business (in contrast to the embodiment above, where the coupon/advertisement is transmitted by the portal server 110). In this embodiment, the user's portal device 150 may automatically trigger the advertisement/coupon when it is brought within range of the business' portal device. In one embodiment, the business' portal device transmits a key to the user's portal device 150, which the user may subsequently use to obtain additional information from the portal server 110 (e.g., relating to a particular product or service). In this embodiment, the business' portal device may or may not communicate directly with the portal server 110.

It should be noted that the foregoing description of portal devices and associated methods includes various business methods. In addition, according to one particular business method, once a user registers on the portal server 110, the PO will assign a portal device 150 to the user free of charge (or for some nominal fee). Upon receipt of the portal device 150 (e.g., in the mail), the user will attach the portal device (e.g., via the client link 160), and register the portal device 150 with the portal server 110. The user may then configure the manner in which he/she will use the portal device 150 (e.g., by selecting the types of portal data/microprograms to be processed and stored in the device). In one embodiment, users will be given the option to upgrade to a more advanced portal device 150 for a specified fee. In one embodiment, however, the fee will be no more than the cost of manufacturing and shipping the device to the user.

In one embodiment, the portal device 150 is shipped to the user with pre-configured data and/or advertisements already stored within the device 150. This may include, for example, the user's name and address; scheduling data for the user for the day/week on which the user will receive the device; and/or any other data stored by the user on the portal server 110.

In one particular embodiment, the portal device 150 is configured to display shipping information (e.g., the shipping bar code and/or destination address) on its display 430. This shipping information may be used by the shipping company to transport the portal device 150 to the user. This embodiment may be shipped to the user using transparent packaging so that the shipping data may be easily read/scanned.

As mentioned above, the portal device 150 may communicate with the portal server 110 using various RF communication techniques. For example, in one particular embodiment, the portal device 150 transmits and receives data to/from a cellular network via the cellular digital packet data ("CDPD") standard. As it is known in the art, the CDPD standard is a digital wireless standard that is deployed as an enhancement to the existing analog cellular network. It provides a packet overlay onto the AMPS network and moves data at 19.2 Kbps over continuously-changing unused intervals in standard voice channels. Accordingly, this embodiment of the portal device is capable of exploiting normally unused bandwidth on a nation-wide, analog cellular network. Embodiments of the portal device may also be configured to transmit/receive data using a variety of other communication standards including 2-way paging standards and third generation ("3G") wireless standards (e.g., UTMS, CDMA 2000, NTT DoCoMo, . . . etc).

Figure 9:
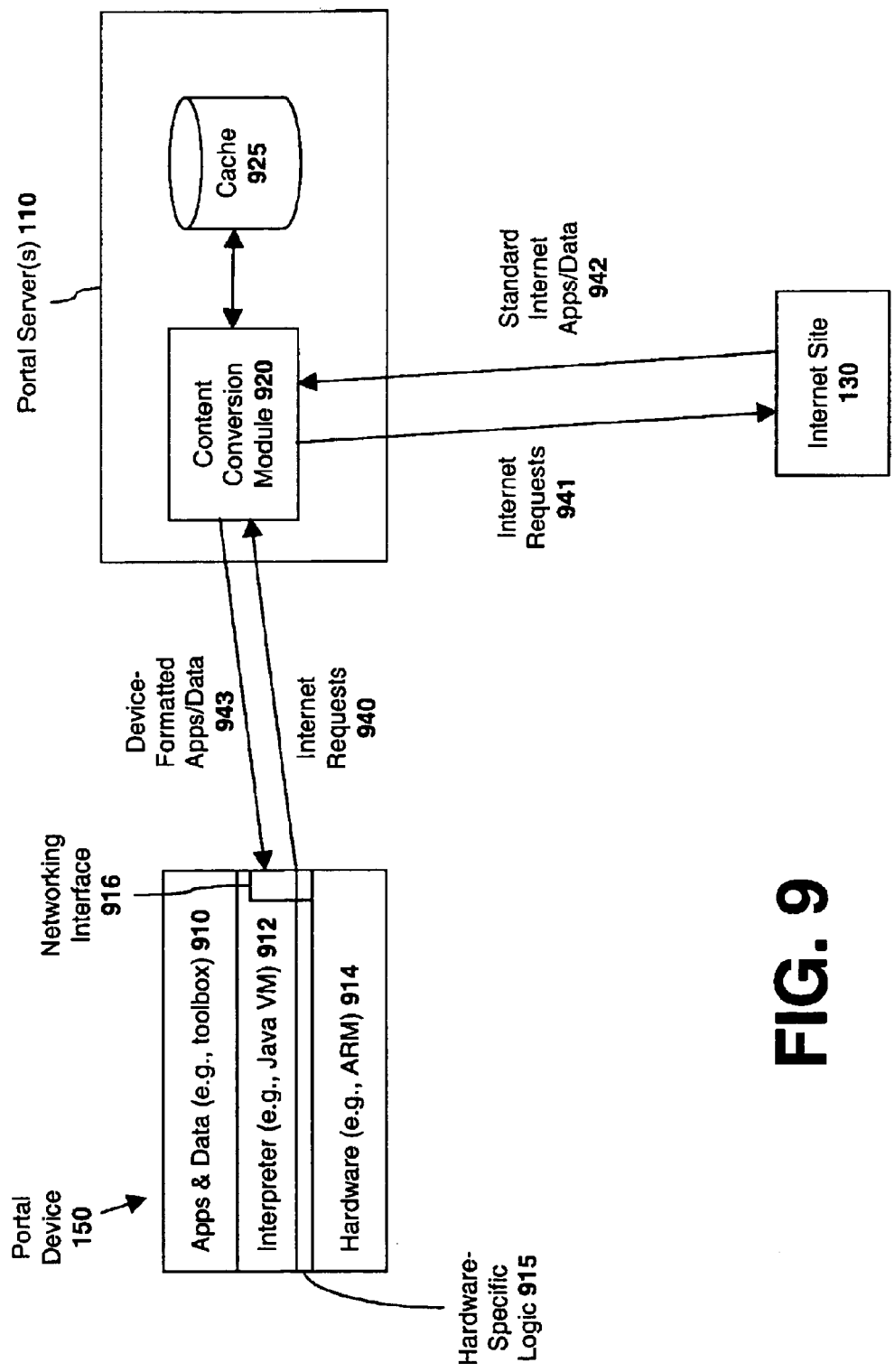
FIG. 9 illustrates a network architecture including a content conversion module according to one embodiment of the invention.

As described above, because certain embodiments of the portal device 150 are configured to process hardware-independent interpreted code (e.g., via an interpreter module 520 such as a Java virtual machine), applications may be ported to new hardware platforms without significant changes. In addition, as illustrated in FIG. 9, in one embodiment, communications functionality is provided via a modular networking interface 916, which may be easily modified/replaced without altering existing portal device applications 910 or significant portions of the bytecode interpreter 912. For example, when changing from a CDPD network to a 3G network, only the network interface component 916 of the VM interpreter 912 will need to be updated (along with any required 3G hardware 914) to support the new 3G protocol.

As described above (and as indicated in FIG. 9), in one embodiment, the interpreter module 912 on the portal device 150 is a Java virtual machine. As such, this embodiment of the portal device 150 is capable of executing a vast library of existing hardware-independent Java applications (e.g., applets/bytecodes) 910. Moreover, as indicated in FIG. 9, one embodiment of the portal device employs a 32-bit RISC-based microprocessor such as an ARM processor. As is known in the art, ARM processors are widely used in PDAs, cell phones and a variety of other wireless devices. It should be noted, however, that various other hardware and software (and/or firmware) architectures may be used for the portal device 150 while still complying with the underlying principles of the invention.

As described above, one embodiment of the portal server 110 converts standard applications and data into a format which the portal device 150 can properly interpret. Accordingly, as illustrated in FIG. 9, this embodiment of the portal server 110 may include a content conversion module 920 for processing portal device 150 requests for Internet content 940. More particularly, in one embodiment, the portal server 110 acts as a proxy for the portal device 150, forwarding Internet requests 940, 941 to the appropriate Internet site 130 on behalf of the portal device 150, receiving responses from the Internet site 130 in a standard Internet format (e.g., Web pages with embedded audio/video and graphical content), and converting the standard Internet responses 924 into a format which the portal device 150 can process (e.g., bytecodes).

For example, the conversion module 920 may include a hypertext markup language ("HTML") rendering module (not shown) for interpreting HTML code and downloading any embedded content in the HTML code (e.g., graphics, video, sound . . . etc) to the portal server 110. The conversion module 920 may then combine the HTML code and embedded content and generate a set of bytecodes for accurately reproducing the requested content on the portal device 150. As described above, in one embodiment, the bytecodes may be Java bytecodes/applets. However, various other types of interpreted and/or non-interpreted code may be generated, depending on the particular type of portal device 150 being used (e.g., one with an interpreter module or one without).

Because the portal server 110 has an intimate knowledge of the capabilities/configuration of each portal device 150 (e.g., screen size, graphics/audio capabilities, available memory, processing power, user preferences, . . . etc) it can reconstruct the requested Internet content accurately, while at the same time minimizing the bandwidth required to transmit the content to the device 150. For example, the conversion module 920 may perform pre-scaling and color depth adjustments to the requested content so that it will be rendered properly within the portal device 150 display. In making these calculations, the conversion may factor in the memory and processing power available on the portal device 150. In addition, the conversion module 920 may compress the requested content using a variety of compression techniques (and thereby preserve network bandwidth).

In one embodiment, the conversion module 920 will simply discard Internet content which either cannot be reproduced on the portal device 150, or which the user has indicated that he/she does not want to be reproduced on the portal device. For example, a user may indicate that he/she does not want sounds to be generated on the portal device 150 or that he/she does not want advertisements transmitted to the portal device 150. The conversion module 920 will then remove any sounds or advertisements embedded in the requested Web page (or other requested Internet content). Because HTML rendering and other advanced processing of Internet content/data is offloaded to the portal server 110 as described above, the portal device 150 can be manufactured using a low power microprocessor or microcontroller, thereby lowering the cost of manufacture and/or the energy consumed by the device 150.

In one embodiment, when a particular Web page or other Internet object has been converted into a format suitable for execution on the portal device 150 (e.g., Java bytecodes and data) the formatted page/object may be stored locally on a cache 925 at the portal server 110 (or other server maintained by the PO). Thus, the next time the content is requested, the conversion module 920 may simply read the previously-generated code from the local cache 925 (i.e., it will no longer need to retrieve the content from remote locations to reconstruct the code).

Various caching techniques and algorithms may be implemented to ensure that the cache 925 is storing Internet data efficiently (i.e., resulting in an acceptable percentage of cache 'hits') and that the data is current. For example, the portal server 110 may cache the most frequently-requested Internet data (e.g., the Yahoo™ home page), and may remove content from the cache based on a least-recently used caching policy. In addition, to ensure that data stored in the cache is current, the portal server 110 may compare the version of the data stored in the cache 925 with the version of data stored at the remote Internet site 130 when the data is requested. Similarly, the portal server 110 may store data in the cache 925 for some predetermined period of time before checking the remote server 130 for a new version. Various other Internet caching techniques may be employed while still complying with the underlying principles of the invention (e.g., those defined in the Internet Caching Protocol ("ICP") and/or the Cache Array Routing Protocol ("CARP")).

Class File Processing

In one embodiment of the invention, class files (or other types of program code) are compressed before being transferred to the portal device 100 (or other data processing device). The compression may be performed manually (e.g., by portal organization staff) or automatically, using a computer-implemented compression/conversion algorithm. Various class file compression/conversion techniques will now be described with respect to FIGS. 10–12.

Figure 10:
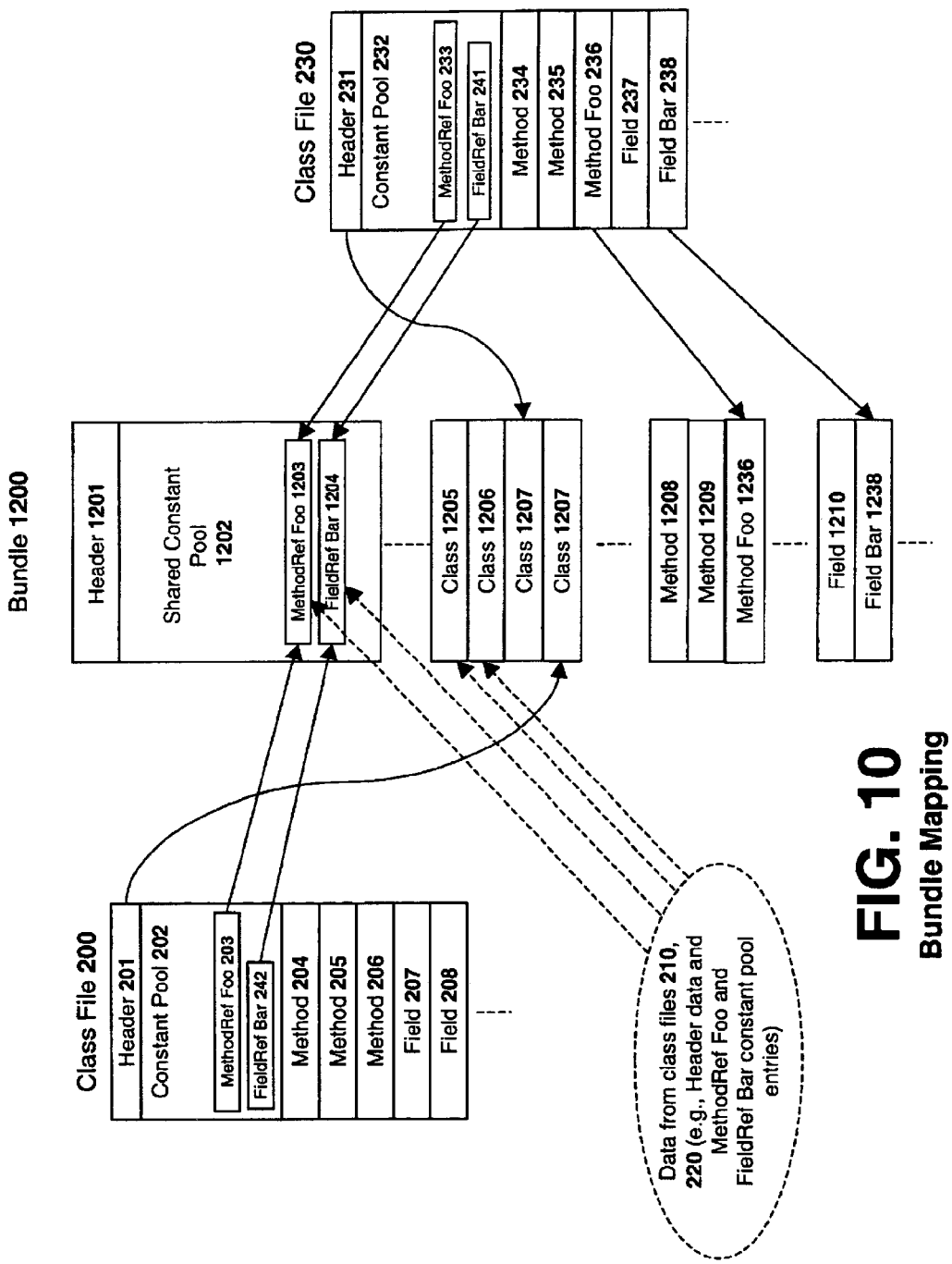
FIG. 10 illustrates a class file bundle according to one embodiment of the invention.

As illustrated in FIG. 10, in one embodiment, each of the class files used in a particular application program (or applet) are combined to form a unified programming object referred to herein as a "bundle" 1200. For the purpose of illustration, the particular bundle 1200 shown in FIG. 10 is constructed from the class files 200, 210, 220 and 230 of FIG. 2. More specifically, the redundant MethodRef Foo entries 203, 213, 223 and 233 are combined into a single, "global" MethodRef Foo entry 1203 in a shared constant pool 1202 within the bundle 1200. Similarly, the redundant FieldRef Bar entries 240–242 are combined into a single, global FieldRef Bar 1204 entry within the shared constant pool, thereby further reducing the memory requirements of the application.

The methods and fields from the original class files 200, 210, 220, 230 are copied to the bundle as well along with various other class file objects (not shown). Thus, Method Foo 236 is copied to the bundle as Method Info entry 1236 and Field Bar 238 is copied to the bundle as Field Info entry 1238. In addition, header data 201, 211, 221, and 231 for each of the class files are copied to the bundle as Class Info objects 1205–1208, respectively.

In one embodiment, unlike the constant pool entries in standard class files, the shared constant pool entries 1202 of the bundle are fixed-length entries (e.g., 32 bits in length). Accordingly, constant pool entries and other data/code within the bundle reference one another based on an offset value from the top of the constant pool (i.e., rather than based on an address in memory). The offsets are generated during the bundle link process (described in greater detail below). For example, referring to FIG. 11, the FieldRef Bar entry within the shared constant pool is assigned a slot number based on its offset from the top of the constant pool—slot # 5 in the example. The constant pool entry itself includes an offset value identifying where the code referenced by the entry resides within the bundle. Thus, the transformed Method Info entry 1236 (i.e., containing Method Foo code) may be located by referencing constant pool slot # 5 and reading the offset provided by the entry (identified as "Offset X" in the example). The same lookup technique may be used to locate other code/data within the bundle. For example, Field Info entry 1238 may be located based on the offset (identified as "Offset Y") provided by the FieldRef Bar constant pool entry in slot # 7.

Figure 11:
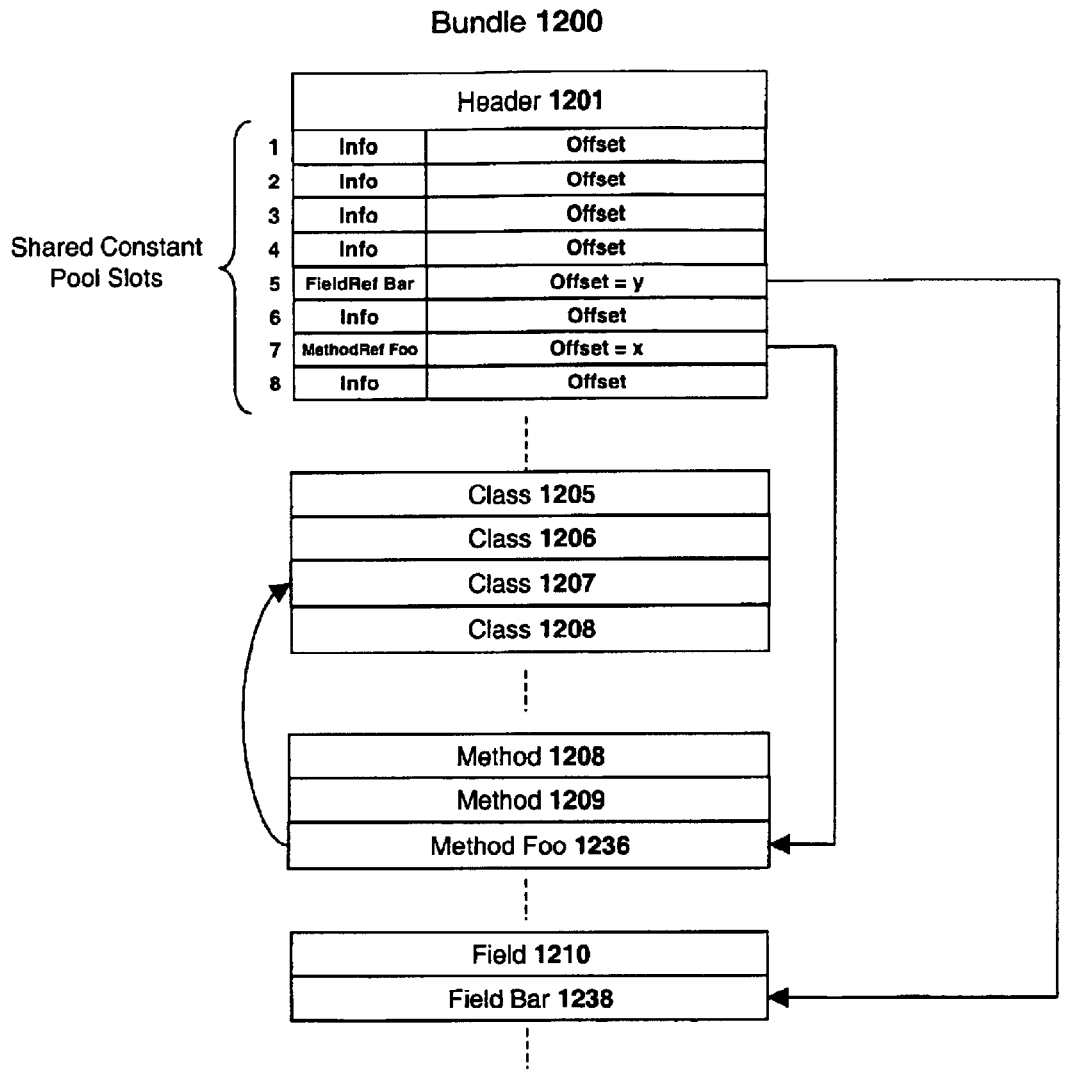
FIG. 11 illustrates pointer/offsets within a bundle.

Conversely, a Class Info entry, Method Info entry, Field Info entry, or any other type of entry within the bundle 1200 may include a pointer/offset used to identify a particular constant pool entry. For example, a bytecode included in the Method Info entry 1236 may cause the creation of a new class of a type defined by a particular constant pool entry. Thus, as indicated in FIG. 11, the Method Info entry 1236 will contain a pointer to its Class Info object 1208 which includes a pointer to the identified constant pool entry (i.e., entry no. 6). Thus, because all of these elements are self-referential, a method can find a class that owns it and the class can identify the bundle to which it is attached. Moreover, because all elements are located relative to one another within the bundle, complex addressing techniques are not required to identify the bundle elements in memory (i.e., the bundle may be loaded at random to any memory area).

During the bundle generation/link process, certain types of data may be copied directly from the class file to which it belongs whereas other types of class file data/code must be modified and/or created. For example, during the generation of Class Info objects, the following data may be copied in substantially unmodified (or slightly modified) form to the bundle: the class reference to itself and the superclass via the constant pool; the count of fields and methods; and access/attribute flags (e.g., public, private, protected, static, abstract, . . . etc). A relative pointer back to the containing bundle is created during the bundle generation process so that the class can identify the bundle to which it belongs (e.g., so it can reference constant pool entries within the bundle). Similarly, a reference to classobject is generated during the generation process.

For Method Info objects, data which may be copied directly includes a reference to the method name via constant pool; a reference to type signature via constant pool; any access/attribute flags; max stacks data; max locals data; the argument count, and the return count, to name a few. A relative pointer back to the Class Info object that the method belongs to will also be generated (i.e., so that the Method Info object can identify the Class Info object within the bundle). Method bytecodes, exception tables, and/or virtual table ("vtable") slot numbers associated with the method may also be modified during the bundle generation process to account for the new locations of data within the shared constant pool. For native methods, function pointers to native code implementations will be filled in during the bundle load.

For Field Info generation, a relative pointer is generated identifying the class to which it belongs (i.e., the Class Info object) and an offset of the field into the object instance. Data which may be copied directly to the bundle includes a reference to the field name via constant pool; a reference to the field type signature via constant pool; and any access/attribute flags.

Figure 12:
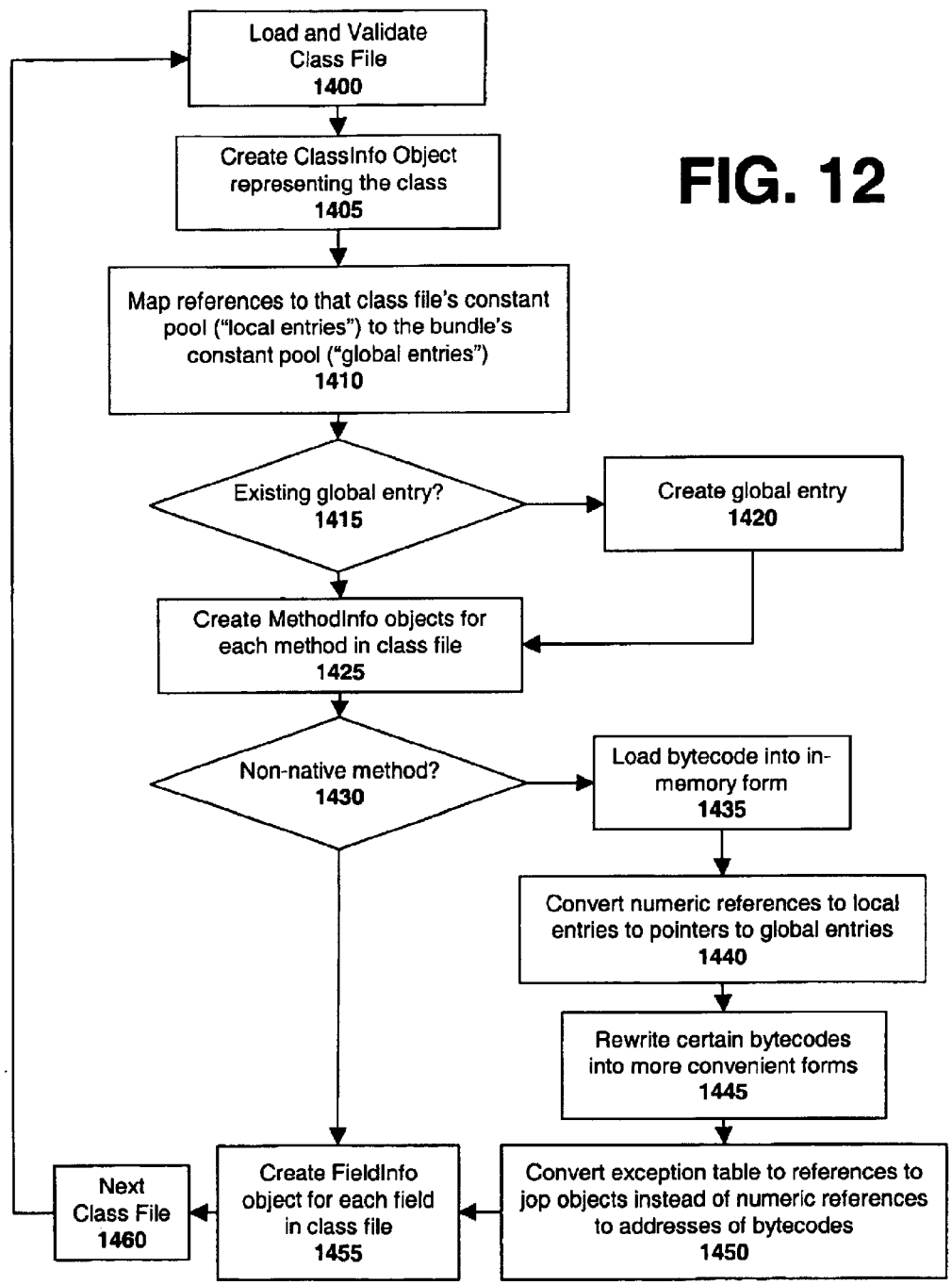
FIG. 12 illustrates a process for generating a bundle according to one embodiment of the invention.

One specific embodiment of a bundle generation/linking process for class files will now be described with respect to the flowchart in FIG. 12. It should be noted, however, that various steps set forth in FIG. 12 are for the purpose of illustration and are not necessary for complying with the underlying principles of the invention.

At 1400, a class file to be incorporated into a bundle is loaded into memory and validated. For example, if the class file is a Java class file, the file is validated per the Java virtual machine specification. For standard Java virtual machine operation, validation typically occurs at runtime when a class is first loaded. Because this embodiment of the invention validates each of the class files before incorporating them in the bundle, however, runtime validation of the class file/bundle is not required, thereby further reducing the processing requirements of the device on which the bundle is executed (e.g., the portal device). The bundle may be cryptographically signed to provide proof of its authenticity.

At 1405, a Class Info object is created for the class file using data extracted from the class file's header including, for example, the name of the class file and other class file identification data and associated parameters. At 1410, any references to the class file's constant pool (i.e., "local" constant pool entries) are mapped to corresponding "global" entries in the bundle's shared constant pool. If a global entry already exists, determined at 1415 (e.g., because another class file contained the entry), then Method Info objects are generated for each method in the class file at 1425. If the global entry does not exist, then a new global entry is created in the shared constant pool at 1420 before the Method Info objects are generated.

All non-native methods (e.g., those methods containing actual bytecode), identified at 1430, are modified in the following manner. Bytecodes within the method are loaded into an in-memory form at 1435 (e.g., a linked list of jop objects, one per java opcode in the bytecode). At 1440, numeric references identifying local entries are converted into pointers to global entries such as the shared constant pool entries described above. At 1445, certain bytecodes are converted/rewritten into more convenient forms. Finally, at 1450, the method's exception table is converted to references to jop objects instead of numeric references to addresses of bytecodes. When method processing is complete, at 1455, Field Info objects are created for each field in the class file and incorporated into the bundle. At 1460, processing for the class file is complete and the next class file to be processed is identified.

Once a complete set of class files have been loaded and linked into the in-memory temporary representation of the bundle, further validation is performed to insure that all references are resolved. The in-memory representation is written out in to a binary bundle object with relative references (via global constant pool entry number) instead of pointers.

Accordingly, one embodiment of the invention temporarily converts the bytecodes into a graph of jop objects so that the constant pool references can be adjusted from local to global numbers and rewrite certain bytecodes. This process may change the size of some bytecodes so the graph is used to track where jump operations pointed before the bytecodes are modified. The bytecodes are modified and adjusted appropriately before they are written back out in the bundle.

By way of a specific example, assuming the following lines of code are used:

20 op_ifne 5
23 op_ldc #3
25 . . .

the bytecode at 20 (op_ifne) jumps forward 5 bytes if an expression is not equal to zero. the op_ldc bytecode loads an item from the constant pool (entry #3). If that constant pool entry were remapped to say #300, the two-byte op_ldc would no longer work (it can only refer to entries 0–255) would therefore be rewritten to a three-byte op_ldcw instruction (of course now the op_ifne needs to be adjusted . . . etc).

In addition, in one embodiment, entries in the bundle's constant pool may refer to entries in a shared system bundle's constant pool (by way of a special bit set in the type identifier). This allows a system bundle to be provided with the core class library and each app in its own bundle (so that the apps can be easily added/removed). Moreover, in one embodiment, the bytecodes are transformed to a similar virtual machine that maintains the semantics of the Java virtual machine but supports a number of alternative bytecodes that provide more compact object code and/or faster system operation.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention.

It will be apparent, however, to one skilled in the art that the invention may be practiced without some of these specific details. For example, while the system described above focuses on a Java class file implementation, the underlying principles of the invention may be performed on various other types of object code (e.g., C++). Accordingly, the scope and spirit of the invention should be judged in terms of the claims which follow.

What is claimed is:

1. A system comprising:
   a portal server to retrieve classfiles from an internet site on behalf of a data processing device, the data processing device comprising a processor for processing program code and an interpreter module for interpreting classfiles, the portal server communicatively coupled to the data processing device over a network;
   wherein the portal server comprises a content conversion module to analyze and convert the classfiles prior to transmission to the data processing device over the network, the conversion comprising generating global method entries and global field entries within a unified programming object, and generating global constant pool entries within the unified programming object by replacing references to methods and field with offsets pointing to global method entries and field entries; and
   wherein after the portal server generates the unified programming object, it transmits the unified programming object to the data processing device over the network.

2. The system as in claim 1 wherein, to rearrange the elements of the two or more classfiles, the content conversion module combines redundant constant pool entries from said two or more classfiles to form a global constant pool entry in a shared constant pool within said unified programming object.

3. The system as in claim 2 wherein combining further comprises:
   rewriting said global constant pool entries to point to elements contained within said unified programming object, said elements corresponding to elements contained in said one or more class files and previously identified by said one or more redundant constant pool entries.

4. The system as in claim 3 wherein one of said global constant pool entries is a methodref entry and said element identified by constant pool entry is a method copied to said unified programming object from said one or more class files.

5. The system as in claim 4 wherein, to rearrange the elements of the two or more classfiles, the content conversion module converts numeric references to local entries within a bytecode in said method to pointers to global constant pool entries.

6. The system as in claim 5 wherein, to rearrange the elements of the two or more classfiles, the content conversion module converts an exception table associated with said method to references to jop objects instead of numeric references to addresses of bytecodes.

7. The system as in claim 3 wherein one of said global constant pool entries is a fieldref entry and said element identified by constant pool entry is a field copied to said unified programming object from said one or more class files.

8. The system as in claim 1 wherein, to rearrange the elements of the two or more classfiles, the content conversion module validates said two or more class files before mapping said elements to form said unified programming object.

9. The system as in claim 8 wherein, to rearrange the elements of the two or more classfiles, the content conversion module converts the classfiles into a graph of jop objects to track where jump operations pointed before modification of said classifies; adjusts constant pool references from local to global numbers based on said graph; and combines the classfiles into the unified programming object.

10. The system as in claim 1 wherein the portal server automatically retrieves classifies from the Internet site on behalf of the data processing device in response to requests for the classifies from the data processing device.

11. The system as in claim 1 wherein the portal server manually retrieves classfiles from the Internet site on behalf of the data processing device in response to requests by the organization managing the portal server.

12. A method implemented on a computer for converting a plurality of classfiles into a unified classfile bundle comprising:
   generating a global method entry within the unified classfile bundle for each method within the plurality of classfiles, each global method entry containing data related to the method from which it was generated;
   generating a global field entry within the unified classfile bundle for each field within the plurality of classfiles, each global field entry containing data related to the field from which it was generated;
   converting local constant pool entries from local constant pools of each of the plurality of classfiles which reference methods and fields or each classfile into global constant pool entries within the unified classfile bundle, wherein converting comprises removing redundant local constant pool entries and replacing the references to methods and fields within each of the local constant pool entries with offsets pointing to the global method entries and field method entries, respectively, within the unified classfile bundle.

13. The method as in claim 12 wherein converting further comprises converting variable-length local constant pool entries from each of the classfiles with fixed-length constant pool entries within the unified classfile bundle.

14. The method as in claim 12 wherein converting further comprises:
   for each local constant pool entry; determining whether a corresponding global constant pool entry already exists; and
   if a corresponding global constant pool entry already exists, then using the existing global constant pool entry in lieu of the local constant pool entry; and
   if the global constant pool entry does not exist, then generating a new global constant pool entry from the local constant pool entry.

15. The method as in claim 12 wherein each global method entry comprises a Method Info object, and wherein generating the Method Info object comprises directly copying data of a first type from each method of each classfile and modifying data of a second type prior to copying the data from each method of the classfile.

16. The method as in claim 13 wherein the data of the first type includes a reference to the method name via the constant pool; a reference to a type signature via the constant pool; access or attribute flags; max stacks data; max locals data; an argument count, and/or a return count.

17. The method as in claim 14 wherein the data of the second type includes Method bytecodes, exception tables, and/or virtual table slot numbers associated with the method.

18. The method as in claim 12 wherein each global field entry comprises a Field Info object, and wherein generating the Field Info object comprises directly copying data of a first type from each field of each classfile and modifying data of a second type prior to copying the data from each field of the classfile.

19. The method as in claim 16 wherein the data of the first type includes a reference to the field name via constant pool; a reference to the field type signature via the constant pool; and/or any access/attribute flags.

20. The method as in claim 12 further comprising:

generating a Class Info object within the unified classfile bundle for each header of each classfile, each Class Info object containing header data from each classfile header.

21. The method as in claim 18 further comprising:

generating a relative pointer for each global method entry and each global field entry, the relative pointer pointing to a Class Info object that the global method entry or global field entry is associated with.

22. The method as in claim 12 further comprising:

generating a relative pointer for each global method entry and each global field entry, the relative pointer pointing to a global constant pool entry that the global method entry or global field entry is associated with.

* * * * *

UNITED STATES PATENT AND TRADEMARK OFFICE
CERTIFICATE OF CORRECTION

PATENT NO. : 6,922,824 B2
DATED : July 26, 2005
INVENTOR(S) : Swetland

It is certified that error appears in the above-identified patent and that said Letters Patent is hereby corrected as shown below:

Column 4,
Lines 19-20, delete "(as illustrated in FIG. 2 and described in detail below)".

Column 5,
Lines 26, 39, 44, 47, 48 and 51, delete "150".
Lines 53, 57, 59, 60 and 61, delete "110".
Lines 61 and 66, delete "220".

Column 6,
Lines 1, 35, 42, 46 and 58, delete "150".
Lines 46 and 59, delete "110".
Line 46, delete "140".
Line 47, delete "210".

Column 7,
Lines 1, 4, 23, 28, 54 and 65, delete "150".
Lines 3 and 11, delete "110".
Lines 6, 33 and 62, delete "160".
Lines 7, 33 and 61, delete "220".

Column 8,
Lines 2, 19, 28, 31, 32, 34, 36, 57, 65 and 67, delete "150".
Lines 12 (both occurrences), 18, 24, 26, 29, 30, 37, 41 and 46, delete "110".
Lines 12, 18, 21, 25, 28, 58 and 66, delete "140".

Column 9,
Lines 3, 35, 36, 46, 53, 61 and 64, delete "110".
Lines 5, 10, 29 and 62, delete "150".
Line 19, delete "140".

Column 10,
Lines 1, 4 and 17, delete "110".
Lines 15, 16, 36, 40, 42 and 67, delete "150".
Lines 37 and 38, delete "160".
Lines 38 and 49, delete "220".

UNITED STATES PATENT AND TRADEMARK OFFICE
CERTIFICATE OF CORRECTION

PATENT NO. : 6,922,824 B2
DATED : July 26, 2005
INVENTOR(S) : Swetland

It is certified that error appears in the above-identified patent and that said Letters Patent is hereby corrected as shown below:

Column 11,
Lines 3, 9, 12, 16, 21, 35 and 45, delete "110".
Lines 4, 7, 17, 19, 21, 22, 26, 29, 31, 36, 40, 44, 47 and 63, delete "150".
Line 20, delete "160".

Column 12,
Lines 13, 23, 27, 30, 32, 34, 38, 47, 51, 54, 59, 62 and 65, delete "150".
Lines 26, 29, 32, 44 and 53, delete "110".
Lines 34 and 35, delete "130".

Column 13,
Lines 3, 7, 8, 13, 16 and 19, delete "150".
Lines 12, 21, 31, 35 and 38, delete "110".
Lines 37 and 40, delete "130".
Line 51, delete "100".

Signed and Sealed this

Twenty-eighth Day of March, 2006

JON W. DUDAS
*Director of the United States Patent and Trademark Office*